United States Patent
Tanaka et al.

(10) Patent No.: US 7,851,563 B2
(45) Date of Patent: Dec. 14, 2010

(54) SILICONE GEL COMPOSITION THAT YIELDS CURED PRODUCT HAVING DISPLACEMENT DURABILITY

(75) Inventors: Miyuki Tanaka, Annaka (JP); Kazuyasu Sato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 190 days.

(21) Appl. No.: 12/233,781

(22) Filed: Sep. 19, 2008

(65) Prior Publication Data

US 2009/0082517 A1 Mar. 26, 2009

(30) Foreign Application Priority Data

Sep. 21, 2007 (JP) .............................. 2007-245848

(51) Int. Cl.
- C08F 283/12 (2006.01)
- C08G 77/12 (2006.01)
- C08G 77/44 (2006.01)
- C08L 83/05 (2006.01)

(52) U.S. Cl. ....................... 525/474; 525/475
(58) Field of Classification Search ................. 525/474, 525/475

See application file for complete search history.

(56) References Cited

U.S. PATENT DOCUMENTS

| | | | | |
|---|---|---|---|---|
| 4,726,964 A * | 2/1988 | Isobe et al. | ................. | 427/515 |
| 5,529,837 A * | 6/1996 | Fujiki et al. | ................. | 442/136 |
| 6,545,076 B2 * | 4/2003 | Kaiya et al. | ................. | 524/268 |
| 7,067,570 B2 * | 6/2006 | Ikeno et al. | ................. | 524/121 |
| 7,452,955 B2 * | 11/2008 | Tanaka et al. | ................. | 528/15 |
| 2005/0250903 A1 | 11/2005 | Tanaka et al. | | |
| 2005/0272893 A1 | 12/2005 | Tanaka et al. | | |
| 2006/0009577 A1 * | 1/2006 | Hara | ......................... | 524/862 |

FOREIGN PATENT DOCUMENTS

| | | |
|---|---|---|
| EP | 0 532 362 A1 | 3/1993 |
| EP | 0732 373 A1 | 9/1996 |
| JP | 2510577 | 4/1996 |
| JP | 2849027 | 11/1998 |

OTHER PUBLICATIONS

Machine Translation of JP 06-345971 A.*

* cited by examiner

Primary Examiner—Randy Gulakowski
Assistant Examiner—Mike Dollinger
(74) Attorney, Agent, or Firm—Oblon, Spivak, McClelland, Maier & Neustadt, L.L.P.

(57) ABSTRACT

The invention provides a silicone gel composition comprising:

(A) an organopolysiloxane represented by an average composition formula (1) shown below:

$$R_a R^1{}_b SiO_{(4-a-b)/2} \quad (1)$$

(wherein, R represents an alkenyl group, $R^1$ represents a monovalent hydrocarbon group that contains no aliphatic unsaturated bonds, and a, b and a+b are numbers that satisfy specific numerical ranges), and containing at least one alkenyl group bonded to a silicon atom within each molecule, (B) a component composed of:

(B-1) an organohydrogenpolysiloxane represented by an average composition formula (2) shown below:

$$(HR^2{}_2 SiO_{1/2})_c (R^3{}_2 SiO)_d (R^4 SiO_{3/2})_e \quad (2)$$

(wherein, $R^2$, $R^3$ and $R^4$ represent monovalent hydrocarbon groups that contain no aliphatic unsaturated bonds, and c, d and e are numbers that satisfy specific numerical ranges, provided that c+d+e=1), containing at least three hydrogen atoms bonded to silicon atoms within each molecule, and containing at least two ($R^4 SiO_{3/2}$) units within each molecule, and (B-2) an organohydrogenpolysiloxane represented by an average composition formula (3) shown below:

$$R^5{}_f H_g SiO_{(4-f-g)/2} \quad (3)$$

(wherein, $R^5$ represents a monovalent hydrocarbon group that contains no aliphatic unsaturated bonds, and f, g and f+g are numbers that satisfy specific numerical ranges), containing either one or two hydrogen atoms bonded to silicon atoms within each molecule, and containing either one or two hydrogen atoms bonded to silicon atoms at molecular chain terminals.

6 Claims, No Drawings

SILICONE GEL COMPOSITION THAT YIELDS CURED PRODUCT HAVING DISPLACEMENT DURABILITY

BACKGROUND OF THE INVENTION

1. Field of the Invention

The present invention relates to an organopolysiloxane gel composition that yields a cured product via an addition reaction of an organopolysiloxane, and relates particularly to an organopolysiloxane gel composition that yields a cured product that can be used favorably for protecting ICs or hybrid ICs and for encapsulating power modules and the like.

2. Description of the Prior Art

Silicone gels and silicone potting materials are addition reaction-curable organopolysiloxane compositions which comprise an organohydrogenpolysiloxane having hydrogen atoms bonded to silicon atoms (namely, SiH groups), an organopolysiloxane having alkenyl groups such as vinyl groups bonded to silicon atoms, and a platinum-based catalyst, and which yield a cured product via an addition reaction of the SiH groups to the alkenyl groups such as vinyl groups. These silicone gels and silicone potting materials exhibit excellent levels of heat resistance, weather resistance, oil resistance, cold resistance, and electrical insulation, and also exhibit low elastic modulus values and low levels of stress, and as a result, they are widely used in the protection of vehicle-mounted electronic components and household electronic appliance components. In recent years, with the ongoing trend towards smaller and lighter electronic componentry, the density of IC components, and the density of the wiring such as wire bonding used to connect these IC components to substrates have continued to increase. Because conventional silicone gels are of comparatively low viscosity they exhibit favorable flow properties, but the cured compositions lack satisfactory strength and elongation properties, and are weak relative to large positional displacements, with the gel cured products sometimes rupturing. In contrast, it is known that compositions that yield cured products with satisfactory strength relative to displacement suffer from higher viscosity, with a corresponding deterioration in the flow properties during the encapsulation step.

Organohydrogenpolysiloxanes having SiH groups that also include branching points are disclosed in Japanese Patent Publication No. 2,510,577 and Japanese Patent Publication No. 2,849,027. However, the cured products of the gel compositions disclosed in these publications deform readily and are prone to rupture when subjected to a large displacement.

SUMMARY OF THE INVENTION

The present invention takes the circumstances described above into consideration, and has an object of providing a gel composition that is of comparatively low viscosity, exhibits favorable flowability, and generates a gel cured product that is capable of withstanding large displacements.

As a result of intensive investigation aimed at achieving the above object, the inventors of the present invention discovered that a silicone gel composition described below was a curable silicone gel composition of low viscosity that yielded a gel cured product that exhibited favorable displacement durability.

In other words, the present invention provides a silicone gel composition comprising:

(A) an organopolysiloxane represented by an average composition formula (1) shown below:

$$R_a R^1_b SiO_{(4-a-b)/2} \qquad (1)$$

(wherein, R represents an alkenyl group, $R^1$ represents a substituted or unsubstituted monovalent hydrocarbon group that contains no aliphatic unsaturated bonds, a represents a number from 0.0001 to 0.2 and b represents a number from 1.7 to 2.2, provided that a+b is a number within a range from 1.9 to 2.4), and containing at least one alkenyl group bonded to a silicon atom within each molecule, (B) a component composed of:

(B-1) an organohydrogenpolysiloxane represented by an average composition formula (2) shown below:

$$(HR^2_2 SiO_{1/2})_c (R^3_2 SiO)_d (R^4 SiO_{3/2})_e \qquad (2)$$

(wherein, $R^2$, $R^3$ and $R^4$ represent identical or different substituted or unsubstituted monovalent hydrocarbon groups that contain no aliphatic unsaturated bonds, c represents a number from 0.005 to 0.3, d represents a number from 0.5 to 0.98, and e represents a number from 0.01 to 0.12, provided that c+d+e=1), containing at least three hydrogen atoms bonded to silicon atoms within each molecule, and containing at least two ($R^4 SiO_{3/2}$) units within each molecule, and (B-2) an organohydrogenpolysiloxane represented by an average composition formula (3) shown below:

$$R^5_f H_g SiO_{(4-f-g)/2} \qquad (3)$$

(wherein, $R^5$ represents a substituted or unsubstituted monovalent hydrocarbon group that contains no aliphatic unsaturated bonds, f represents a number from 0.7 to 2.2 and g represents a number from 0.001 to 0.5, provided that f+g is a number within a range from 0.8 to 2.5), containing either one or two hydrogen atoms bonded to silicon atoms within each molecule, and containing either one or two hydrogen atoms bonded to silicon atoms at molecular chain terminals, in which the number α of hydrogen atoms bonded to silicon atoms derived from component (B-1) and the number β of hydrogen atoms bonded to silicon atoms derived from component (B-2) satisfy a formula (4) shown below:

$$0 \leq \beta/(\alpha+\beta) \leq 0.75 \qquad (4)$$

and the combined total of hydrogen atoms bonded to silicon atoms within component (B) per alkenyl group bonded to a silicon atom within component (A) is within a range from 0.1 to 5, and (C) an effective quantity of a platinum-based catalyst.

The present invention also provides a cured product having a penetration value prescribed in JIS K-2207 of 10 to 200, obtained by curing the above silicone gel composition.

The curable silicone gel composition of the present invention has a low viscosity and can therefore flow readily into narrow gaps and the like, and upon curing, yields a low-stress gel cured product that suffers no gel rupture even when exposed to large displacements caused by vibration or deformation. Accordingly, the cured product can be used favorably for protecting ICs, hybrid ICs and power modules and the like.

DETAILED DESCRIPTION OF THE PREFERRED EMBODIMENTS

The composition of the present invention comprises the components (A) to (C) described above, and in one particular embodiment, consists of (is composed solely of) these components (A) to (C). In other embodiments, the composition of the present invention may comprise the components (A) to (C) and either one, or two or more, of the optional components described below, or may consist of the components (A) to (C) and either one, or two or more, of the optional components described below. The component (A) is preferably the only organopolysiloxane containing an alkenyl group bonded to a silicon atom within the composition, and the component (B) preferably is the only organohydrogenpolysiloxanes containing SiH groups within the composition.

Each of the composition components is described below in more detail. In this description, viscosity values refer to values measured at 25° C.

[(A) Organopolysiloxane]

The component (A) in the composition of the present invention functions as the main constituent (base polymer) of the composition. The component (A) is an organopolysiloxane that is represented by the above average composition formula (1), and contains at least one alkenyl group bonded to a silicon atom (hereafter also referred to as a "silicon atom-bonded alkenyl group") within each molecule. The number of silicon atom-bonded alkenyl groups within each molecule is preferably within a range from 2 to 50, and is even more preferably from 2 to 20. The silicon atom-bonded alkenyl groups may be bonded solely to silicon atoms at the molecular chain terminals, solely to silicon atoms at non-terminal positions within the molecular chain (namely, positions other than the molecular chain terminals), or may also be bonded to both these types of silicon atoms.

In the above formula (1), R represents an alkenyl group in which the number of carbon atoms is preferably from 2 to 6, and more preferably from 2 to 4. Specific examples of this alkenyl group include lower alkenyl groups such as a vinyl group, allyl group, propenyl group, isopropenyl group, butenyl group and isobutenyl group, and a vinyl group is particularly preferred. $R^1$ represents a substituted or unsubstituted monovalent hydrocarbon group containing no aliphatic unsaturated bonds, in which the number of carbon atoms is typically from 1 to 10, and preferably from 1 to 6. Specific examples of $R^1$ include alkyl groups such as a methyl group, ethyl group, propyl group, isopropyl group, butyl group, isobutyl group, tert-butyl group, pentyl group, hexyl group, cyclohexyl group, octyl group, decyl group or dodecyl group; aryl groups such as a phenyl group or tolyl group; aralkyl groups such as a benzyl group or phenylethyl group; and groups in which a portion of, or all of, the hydrogen atoms within one of the above groups have been substituted with a halogen atom such as a fluorine atom or chlorine atom, such as a chloromethyl group or 3,3,3-trifluoropropyl group. From the viewpoint of factors such as the ease of synthesis, a methyl group, phenyl group or 3,3,3-trifluoropropyl group is preferred.

In the formula (1), a is a number within a range from 0.0001 to 0.2, and is preferably a number from 0.0005 to 0.1. b is a number within a range from 1.7 to 2.2, and is preferably a number from 1.9 to 2.0. The value of a+b is a number within a range from 1.9 to 2.4, and is preferably a number from 1.95 to 2.05.

There are no particular restrictions on the molecular structure of the organopolysiloxane of this component, and straight-chain structures; branched structures comprising $RSiO_{3/2}$ units, $R^1SiO_{3/2}$ units and/or $SiO_2$ units (wherein, the groups represented by R and $R^1$ are as defined above) at portions within the molecular chain; cyclic structures; and three dimensional network (resin-like) structures are all possible, although typically, the organopolysiloxane is a straight-chain diorganopolysiloxane in which the principal chain basically comprises repeating diorganosiloxane units and both molecular chain terminals are blocked with triorganosiloxy groups.

The viscosity of the organopolysiloxane of this component is preferably within a range from 50 to 100,000 mPa·s, and is even more preferably from 100 to 10,000 mPa·s. If this viscosity is within the range from 50 to 100,000 mPa·s, then the strength, flowability and workability of the resulting cured product are superior.

Examples of organopolysiloxanes of this component that satisfy the requirements described above include the organopolysiloxanes represented by a general formula (1a) shown below:

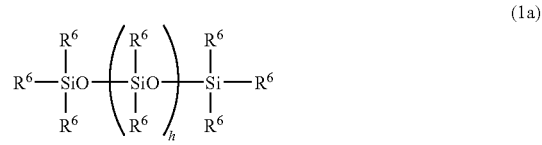

(wherein, each $R^6$ group represents, independently, a substituted or unsubstituted monovalent hydrocarbon group, provided at least one of the $R^6$ groups is an alkenyl group, and h represents an integer from 20 to 2,000).

In this formula (1a), the substituted or unsubstituted monovalent hydrocarbon groups represented by $R^6$ are the same as those defined above for R (the alkenyl group) and $R^1$ (the substituted or unsubstituted monovalent hydrocarbon group containing no aliphatic unsaturated bonds), and the number of carbon atoms within the group, and specific examples of the group, are as described above. Furthermore, h is preferably an integer within a range from 40 to 1,200, and is even more preferably from 50 to 600.

Specific examples of the organopolysiloxanes represented by the above formula (1a) include dimethylpolysiloxane with both molecular chain terminals blocked with dimethylvinylsiloxy groups, dimethylpolysiloxane with one molecular chain terminal blocked with a trimethylsiloxy group and the other molecular chain terminal blocked with a dimethylvinylsiloxy group, copolymers of dimethylsiloxane and methylvinylsiloxane with both molecular chain terminals blocked with trimethylsiloxy groups, copolymers of dimethylsiloxane and methylvinylsiloxane with one molecular chain terminal blocked with a trimethylsiloxy group and the other molecular chain terminal blocked with a dimethylvinylsiloxy group, copolymers of dimethylsiloxane and methylvinylsiloxane with both molecular chain terminals blocked with dimethylvinylsiloxy groups, and copolymers of dimethylsiloxane and diphenylsiloxane with both molecular chain terminals blocked with dimethylvinylsiloxy groups.

The organopolysiloxane of this component may use either a single material, or a combination of two or more different materials.

[(B) Organohydrogenpolysiloxane]

The component (B-1) of the composition of the present invention, represented by the above average composition formula (2), is an essential component of the present invention that reacts with the above component (A) and functions as a cross-linking agent. This component (B-1) is represented by the above average composition formula (2). In this formula, c is a number from 0.005 to 0.3, preferably from 0.01 to 0.25, and even more preferably from 0.02 to 0.2, d is a number from 0.5 to 0.98, preferably from 0.6 to 0.97, and even more preferably from 0.7 to 0.95, and e is a number from 0.01 to 0.12, preferably from 0.015 to 0.1, and even more preferably from 0.02 to 0.08, provided that c+d+e=1. There are no particular restrictions on the component (B-1), provided each molecule contains at least three hydrogen atoms bonded to silicon atoms (namely, hydrosilyl groups represented by SiH), preferably at least three diorganohydrogensiloxy groups, namely terminal groups having a hydrogen atom bonded to a silicon atom as represented by $(HR^2{}_2SiO_{1/2})$ (in other words, at least three hydrogen atoms bonded to silicon atoms at the molecular chain terminals), and also contains at least two branching points represented by $(R^4SiO_{3/2})$ (namely, organosilsesquioxane units). If c is less than 0.005, then a silicone gel cured product can not be obtained, whereas if c exceeds 0.3, then the displacement durability of the cured product tends to deteriorate. Furthermore, if e is less than 0.01, then a silicone gel cured product can not be obtained, whereas if e exceeds 0.12, then areas of coarseness and fineness tend to develop on the surface of the uniform cured product.

There are no particular restrictions on the molecular structure of the component (B-1), provided it satisfies the requirements described above, and the component may be synthesized using conventional methods.

The viscosity of the organohydrogenpolysiloxane of the component (B-1) is typically within a range from 1 to 10,000 mPa·s, is preferably from 3 to 2,000 mPa·s, and is most preferably from 10 to 1,000 mPa·s, and the component is ideally a liquid at room temperature (25° C.).

In the average composition formula (2), $R^2$ to $R^4$ are substituted or unsubstituted monovalent hydrocarbon groups containing no aliphatic unsaturated bonds, in which the number of carbon atoms is preferably from 1 to 10, and more preferably from 1 to 6. Specific examples of these groups include alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group or decyl group; aryl groups such as a phenyl group, tolyl group, xylyl group or naphthyl group; aralkyl groups such as a benzyl group, phenylethyl group or phenylpropyl group; and groups in which a portion of, or all of, the hydrogen atoms within one of the above groups have been substituted with a halogen atom such as a fluorine atom or chlorine atom, such as a 3,3,3-trifluoropropyl group. Of these, an alkyl group, aryl group or 3,3,3-trifluoropropyl group is preferred, and a methyl group, phenyl group or 3,3,3-trifluoropropyl group is particularly desirable.

Specific examples of the organohydrogenpolysiloxane represented by the average composition formula (2) include copolymers composed of $(CH_3)_2HSiO_{1/2}$ units, $(CH_3)_2SiO$ units and $CH_3SiO_{3/2}$ units, copolymers composed of $(CH_3)_2HSiO_{1/2}$ units, $(C_6H_5)_2SiO$ units, $(CH_3)_2SiO$ units and $CH_3SiO_{3/2}$ units, copolymers composed of $CH_3C_6H_5HSiO_{1/2}$ units, $(CH_3)_2SiO$ units and $CH_3SiO_{3/2}$ units, copolymers composed of $(CH_3)_2HSiO_{1/2}$ units, $(CH_3)_2SiO$ units and $C_6H_5SiO_{3/2}$ units, copolymers composed of $(CH_3)(CF_3C_2H_4)HSiO_{1/2}$ units, $(CH_3)(CF_3C_2H_4)SiO$ units and $CH_3SiO_{3/2}$ units, copolymers composed of $(CH_3)(CF_3C_2H_4)HSiO_{1/2}$ units, $(CH_3)(CF_3C_2H_4)SiO$ units, $(CH_3)_2SiO$ units and $CH_3SiO_{3/2}$ units, copolymers composed of $(CH_3)_2HSiO_{1/2}$ units, $(CH_3)(CF_3C_2H_4)SiO$ units and $CH_3SiO_{3/2}$ units, copolymers composed of $(CH_3)_2HSiO_{1/2}$ units, $(CH_3)(CF_3C_2H_4)SiO$ units, $(CH_3)_2SiO$ units and $CH_3SiO_{3/2}$ units, and copolymers composed of $(CH_3)_2HSiO_{1/2}$ units, $(CH_3)(CF_3C_2H_4)SiO$ units, $(CH_3)_2SiO$ units and $CF_3C_2H_4SiO_{3/2}$ units.

The organohydrogenpolysiloxane of the component (B-1) may use either a single material, or a combination of two or more different materials.

The component (B-2) of the composition of the present invention, represented by the above average composition formula (3), is also a component that reacts with the above component (A) and functions as a cross-linking agent. The component (B-2) is an organohydrogenpolysiloxane containing either one or two, and preferably two, hydrogen atoms bonded to silicon atoms within each molecule, and containing either one or two hydrogen atoms bonded to silicon atoms at the molecular chain terminals (such as the diorganohydrogensiloxy groups represented by $(HR^2{}_2SiO_{1/2})$ within the average composition formula (2) of the above component (B-1)). In those cases where the organohydrogenpolysiloxane contains only one diorganohydrogensiloxy group represented by $(HR^2{}_2SiO_{1/2})$ in one molecule, the component (B-2) either contains no hydrogen atoms bonded to (non-terminal) silicon atoms within the molecular chain, namely no organohydrogensiloxy units represented by (HRSiO), or contains only one hydrogen atom bonded to a non-terminal silicon atom within each molecule. A diorganopolysiloxane with both molecular chain terminals blocked with diorganohydrogensiloxy groups is particularly preferred as the component (B-2).

In the above average composition formula (3), each $R^5$ group represents, independently, a substituted or unsubstituted monovalent hydrocarbon group containing no aliphatic unsaturated bonds, in which the number of carbon atoms is preferably from 1 to 10, and more preferably from 1 to 6. Specific examples of these groups include alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group or decyl group; aryl groups such as a phenyl group, tolyl group, xylyl group or naphthyl group; aralkyl groups such as a benzyl group, phenylethyl group or phenylpropyl group; and groups in which a portion of, or all of, the hydrogen atoms within one of the above groups have been substituted with a halogen atom such as a chlorine atom, bromine atom or fluorine atom, such as a 3,3,3-trifluoropropyl group. Of these, an alkyl group, aryl group or 3,3,3-trifluoropropyl group is preferred, and a methyl group, phenyl group or 3,3,3-trifluoropropyl group is particularly desirable.

The number of silicon atoms within a single molecule of the organohydrogenpolysiloxane of the component (B-2) (namely, the polymerization degree) is typically within a range from 10 to 1,000, although from the viewpoints of ensuring favorable handling and workability properties for the composition, and producing a cured product with favorable properties (such as a low elastic modulus and low stress), the number of silicon atoms is preferably within a range from 10 to 500, and even more preferably from 15 to 200.

The organohydrogenpolysiloxane of the component (B-2) may use either a single material, or a combination of two or more different materials.

In terms of the relationship between the number $\alpha$ of hydrogen atoms bonded to silicon atoms derived from the component (B-1) and the number $\beta$ of hydrogen atoms bonded to silicon atoms derived from the component (B-2), the component (B) should satisfy the above formula (4): $0 \leq \beta/(\alpha+\beta) \leq 0.75$, namely the value of $\beta/(\alpha+\beta)$ should fall within a range from 0 to 0.75. In a preferred component (B), $0 < \beta/(\alpha+\beta) \leq 0.75$, in an even more preferred component (B), $0.01 \leq \beta/(\alpha+\beta) \leq 0.65$, and in a particularly preferred component (B), $0.1 \leq \beta/(\alpha+\beta) \leq 0.60$. If this value of $\beta/(\alpha+\beta)$ exceeds 0.75, then the strength of the composition deteriorates, and the durability of the cured silicone gel relative to displacement also deteriorates. The component (B-1) and the component (B-2) are preferably used in combination, and by using a combination of both components, a gel cured product with superior properties of strength and elongation and capable of withstanding even large displacements can be obtained. If the component (B-2) is not added, then it is desirable, in terms of achieving favorable resistance to displacement, that the silicone gel composition of the present invention contains no amine compounds, and particularly diamine compounds such as alkylenediamines, in which the hydrogen atoms bonded to the nitrogen atoms are either unsubstituted or are substituted with alkyl groups, such as ethylenediamine or N,N,N',N'- tetramethylethylenediamine.

The blend quantity of the component (B) is set such that the combined total of hydrogen atoms bonded to silicon atoms within the component (B) (namely, the combination of hydrogen atoms bonded to silicon atoms derived from the component (B-1) and hydrogen atoms bonded to silicon atom derived from the component (B-2)) per alkenyl group bonded to a silicon atom within component (A) is within a range from 0.1 to 5, preferably from 0.2 to 3, and more preferably from 0.3 to 2. If this quantity of silicon atom-bonded hydrogen atoms is less than 0.1, then the cross-linking density becomes too low, and the composition may not cure. In contrast, a number of silicon atom-bonded hydrogen atoms exceeding 5 may cause foaming due to a dehydrogenation reaction, and may have an adverse effect on the heat resistance.

[(C) Platinum-Based Catalyst]

The component (C) of the composition of the present invention is a component for accelerating the addition reaction between the silicon atom-bonded alkenyl groups within the component (A) and the silicon atom-bonded hydrogen atoms groups within the component (B). The component (C) is a platinum-based catalyst, or more specifically, either platinum and/or a platinum-based compound.

This platinum and/or a platinum-based compound can employ conventional materials, and specific examples include platinum black, chloroplatinic acid, alcohol modified products of chloroplatinic acid, and complexes of chloroplatinic acid with olefin aldehydes, vinylsiloxanes or acetylene alcohols.

The blend quantity of the component (C) need only be an effective catalytic quantity, and can be increased or decreased in accordance with the desired curing rate. A typical quantity, calculated as the mass of platinum atoms relative to the mass of the component (A), is within a range from 0.1 to 1,000 ppm, and quantities from 1 to 300 ppm are preferred. If this blend quantity is too small, then the addition reaction slows markedly, and the composition may not cure at all. In contrast, if the blend quantity is too large, then not only does the heat resistance of the cured product tend to deteriorate, but the high cost of the platinum makes the composition unviable from a cost perspective.

The platinum-based catalyst of this component may use either a single material, or a combination of two or more different materials.

[Other Optional Components]

In addition to the components (A) through (C) described above, other optional components may also be added to the composition of the present invention, provided they do not impair the actions and effects of the present invention.

Examples of such optional components include reaction retarders (and particularly reaction retarders other than alkylenediamines in which the hydrogen atoms bonded to nitrogen atoms are either unsubstituted or substituted with alkyl groups), inorganic fillers, heat resistance imparting agents, flame retardancy imparting agents, thixotropic imparting agents, pigments, dyes, and organopolysiloxanes that contain neither silicon atom-bonded hydrogen atoms nor silicon atom-bonded alkenyl groups (that is, organopolysiloxanes different from the components (A) and (B)).

Reaction retarders are components for retarding the reaction of the above composition, and specific examples include acetylene-based reaction retarders such as 1-ethynylcyclohexanol, amine-based reaction retarders, and ester-based reaction retarders such as carboxylate ester-based and phosphite ester-based reaction retarders.

Examples of inorganic fillers include fumed silica, crystalline silica, precipitated silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fibers, as well as the above types of inorganic fillers that have undergone a hydrophobic surface treatment with an organosilicon compound such as an organoalkoxysilane compound, organochlorosilane compound, organosilazane compound or low molecular weight siloxane compound, and silicone rubber powders and silicone resin powders. These optional components may be used either alone, or in combinations of two or more different materials.

[Method of Preparing Composition]

The composition of the present invention can be prepared by mixing each of the components described above using normal methods. The composition of the present invention may either be used as a one-pot composition, or may be divided into two or more parts if required. For example, in the case of a two-pot composition, the composition may be divided into a part composed of a portion of the component (A) and the component (C), and a part composed of the remainder of the component (A) and the component (B). Optional components may be blended with either part. The composition of the present invention may be cured either at ambient temperature (25° C.), or under temperature conditions that are appropriate for the intended application.

EXAMPLES

Specifics of the present invention are described below using a series of examples and comparative examples, although the present invention is in no way limited by the examples presented below. In the examples below, the units "parts" and "%" refer to "parts by mass" and "% by mass" respectively. Furthermore, the penetration values listed for the silicone gel cured products represent values measured in accordance with JIS K2207.

Example 1

100 parts of a dimethylpolysiloxane with both molecular chain terminals blocked with dimethylvinylsiloxy groups and having a viscosity of 600 mPa·s, 12.8 parts of a copolymer of dimethylhydrogensiloxane, dimethylsiloxane and methylsiloxane having a viscosity of 35 mm²/s and represented by an average composition formula (5) shown below:

$$(H(CH_3)_2SiO_{1/2})_{12}((CH_3)_2SiO)_{120}(CH_3SiO_{3/2})_6 \quad (5)$$

(in this example, the ratio represented by β/(α+β) in the above formula (4) was 0, and the ratio of the number of silicon atom-bonded hydrogen atoms within the component (B) per silicon atom-bonded alkenyl group within the component (A) (hereafter abbreviated as H/Vi) was 1.03), 0.05 parts of a dimethylpolysiloxane solution of a chloroplatinic acid-vinylsiloxane complex containing 1% by mass of platinum atoms, and 0.005 parts of 1-ethynylcyclohexanol were mixed together uniformly, yielding a composition 1. When this composition 1 was cured by heating at 120° C. for 30 minutes, a silicone gel cured product with a penetration value of 60 was obtained.

Example 2

100 parts of a dimethylpolysiloxane with both molecular chain terminals blocked with dimethylvinylsiloxy groups and having a viscosity of 1,000 mPa·s, 18.3 parts of a copolymer of dimethylhydrogensiloxane, dimethylsiloxane and methylsiloxane having a viscosity of 91 mm²/s and represented by an average composition formula (6) shown below:

$$(H(CH_3)_2SiO_{1/2})_6((CH_3)_2SiO)_{120}(CH_3SiO_{3/2})_4 \quad (6)$$

(in this example, the ratio represented by $\beta/(\alpha+\beta)$ in the above formula (4) was 0, and H/Vi was 0.96), 0.05 parts of a dimethylpolysiloxane solution of a chloroplatinic acid-vinylsiloxane complex containing 1% by mass of platinum atoms, and 0.01 parts of 1-ethynylcyclohexanol were mixed together uniformly, yielding a composition 2. When this composition 2 was cured by heating at 100° C. for 60 minutes, a silicone gel cured product with a penetration value of 53 was obtained.

Example 3

100 parts of a dimethylpolysiloxane with both molecular chain terminals blocked with dimethylvinylsiloxy groups and having a viscosity of 600 mPa·s, 11.6 parts of the copolymer of dimethylhydrogensiloxane, dimethylsiloxane and methylsiloxane represented by the above average composition formula (6), 12.4 parts of a dimethylpolysiloxane with both molecular chain terminals blocked with dimethylhydrogensiloxy groups, having a viscosity of 45 mm²/s and represented by a formula (7) shown below:

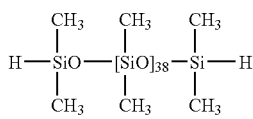

(7)

(in this example, the ratio represented by $\beta/(\alpha+\beta)$ in the above formula (4) was 0.54, and H/Vi was 1.06), 0.05 parts of a dimethylpolysiloxane solution of a chloroplatinic acid-vinylsiloxane complex containing 1% by mass of platinum atoms, and 0.01 parts of 1-ethynylcyclohexanol were mixed together uniformly, yielding a composition 3. When this composition 3 was cured by heating at 120° C. for 30 minutes, a cured product with a penetration value of 35 was obtained.

Example 4

100 parts of a dimethylpolysiloxane with both molecular chain terminals blocked with dimethylvinylsiloxy groups and having a viscosity of 400 mPa·s, 12.5 parts of the copolymer of dimethylhydrogensiloxane, dimethylsiloxane and methylsiloxane represented by the above average composition formula (6), 14.8 parts of a dimethylpolysiloxane with both molecular chain terminals blocked with dimethylhydrogensiloxy groups, having a viscosity of 83 mm²/s and represented by a formula (8) shown below:

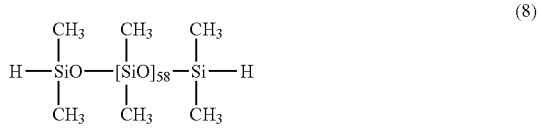

(8)

(in this example, the ratio represented by $\beta/(\alpha+\beta)$ in the above formula (4) was 0.48, and H/Vi was 0.89), 0.05 parts of a dimethylpolysiloxane solution of a chloroplatinic acid-vinylsiloxane complex containing 1% by mass of platinum atoms, and 0.01 parts of 1-ethynylcyclohexanol were mixed together uniformly, yielding a composition 4. When this composition 4 was cured by heating at 120° C. for 30 minutes, a cured product with a penetration value of 54 was obtained.

Comparative Example 1

With the exception of replacing the 18.3 parts of the copolymer of dimethylhydrogensiloxane, dimethylsiloxane and methylsiloxane represented by the above average composition formula (6) used in Example 2 with a combination of 0.18 parts of a copolymer of dimethylsiloxane and methylhydrogensiloxane with both terminals blocked with trimethylsiloxy groups, having a viscosity of 100 mm²/s and represented by a formula (9) shown below:

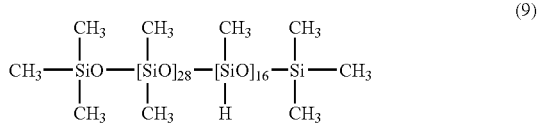

(9)

and 7.3 parts of a dimethylpolysiloxane with both terminals blocked with dimethylhydrogensiloxy groups, having a viscosity of 17 mm²/s and represented by a formula (10) shown below:

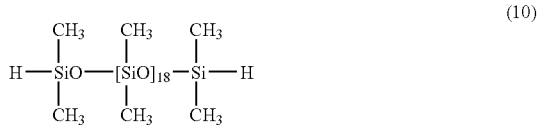

(10)

(in this example, the ratio represented by $\beta/(\alpha+\beta)$ in the above formula (4) was 1, and H/Vi was 0.87), a composition 5 was obtained in the same manner as Example 2. When this composition 5 was cured by heating at 100° C. for 60 minutes, a silicone gel cured product with a penetration value of 105 was obtained.

Comparative Example 2

100 parts of a dimethylpolysiloxane with both molecular chain terminals blocked with dimethylvinylsiloxy groups and having a viscosity of 880 mPa·s, 6.6 parts of a copolymer of dimethylhydrogensiloxane, dimethylsiloxane and methylsiloxane having a viscosity of 11 mm²/s and represented by an average composition formula (11) shown below:

$$(H(CH_3)_2SiO_{1/2})_3((CH_3)_2SiO)_{30}(CH_3SiO_{3/2})_1 \quad (11)$$

(in this example, H/Vi was 0.54), 0.015 parts of an isopropyl alcohol solution of chloroplatinic acid (platinum element content: 2% by weight), and 0.001 parts of N,N,N',N'-tetramethylethylenediamine were mixed together uniformly, yielding a composition 6. When this composition 6 was cured by heating at 150° C. for 30 minutes, a silicone gel cured product with a penetration value of 230 was obtained.

Comparative Example 3

With the exceptions of altering the quantity used of the copolymer of dimethylhydrogensiloxane, dimethylsiloxane and methylsiloxane represented by the above average composition formula (6) to 2 parts, and using 8 parts of a dimethylpolysiloxane with both terminals blocked with dimethylhydrogensiloxy groups, represented by a formula (10) shown below:

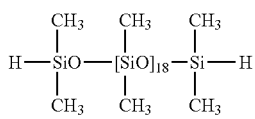
(10)

in place of the dimethylpolysiloxane represented by the formula (8) (in this example, the ratio represented by β/(α+β) in the above formula (4) was 0.89, and H/Vi was 0.71), a composition 7 was obtained in the same manner as Example 4. When this composition 7 was cured by heating at 120° C. for 30 minutes, a silicone gel cured product with a penetration value of 98 was obtained.

[Evaluation Methods]

Using each of the five different cured products obtained in the above examples and comparative examples, a gel sheet of thickness 2 mm was prepared, and the elongation and tear strength of the sheet were evaluated in accordance with JIS K-6251 and JIS K-6252 respectively. The results are shown below in Table 1 and Table 2.

TABLE 1

| | Example 1 | Example 2 | Example 3 | Example 4 |
|---|---|---|---|---|
| H/Vi | 1.03 | 0.96 | 1.06 | 0.89 |
| β/α + β | 0 | 0 | 0.54 | 0.48 |
| Curing conditions | 120° C. × 30 min. | 100° C. × 60 min. | 120° C. × 30 min. | 120° C. × 30 min. |
| Penetration | 60 | 53 | 35 | 54 |
| Elongation (%) | 480 | 380 | 600 | 520 |
| Tear strength (N/m) | 730 | 700 | 930 | 890 |

TABLE 2

| | Comparative example 1 | Comparative example 2* | Comparative example 3 |
|---|---|---|---|
| H/Vi | 0.87 | 0.54 | 0.71 |
| β/α + β | 1 | — | 0.89 |
| Curing conditions | 100° C. × 60 min. | 150° C. × 30 min. | 120° C. × 30 min. |
| Penetration | 65 | 230 | 98 |
| Elongation (%) | 330 | — | 190 |
| Tear strength (N/m) | 100 | — | 100 |

*The gel strength (elongation and tear strength) of the comparative example 2 could not be measured.

[Evaluations]

Examples 1 to 4 satisfied the requirements of the present invention, and yielded silicone gel cured products with favorable rubber properties.

In contrast, in Comparative Examples 1 to 3, the organohydrogenpolysiloxane of the component (B) had either no branching points or only minimal branching points, and therefore the composition did not satisfy the requirements of the present invention. The cured product obtained in Comparative Example 1 exhibited penetration and elongation values similar to those of Example 1, but the rubber strength (the elongation and tear strength) was markedly inferior when compared with Examples 1 to 4. Furthermore, the cured product obtained in Comparative Example 2 yielded an extremely high penetration value, meaning the gel strength (elongation and tear strength) could not be measured. The cured product obtained in Comparative Example 3 exhibited markedly inferior rubber strength (elongation and tear strength) when compared with Examples 1 to 4.

From the above findings it is evident that it is only when the requirements of the present invention are satisfied that a silicone gel composition can be obtained that yields a cured product with superior displacement durability.

What is claimed is:

1. A silicone gel composition comprising:
(A) an organopolysiloxane represented by formula (1):

(1), wherein R represents an alkenyl group, $R^1$ represents a substituted or unsubstituted monovalent hydrocarbon group that contains no aliphatic unsaturated bonds, a represents a number from 0.0001 to 0.2 and b represents a number from 1.7 to 2.2, provided that a+b is a number within a range from 1.9 to 2.4, and wherein said organopolysiloxane (A) comprises at least one alkenyl group bonded to a silicon atom at the molecular chain terminals and/or at non-terminal positions within the molecular chain, (B) a component comprising:
(B-1) an organohydrogenpolysiloxane represented by formula (2):

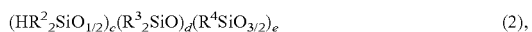
(2), wherein $R^2$, $R^3$ and $R^4$ represent identical or different substituted or unsubstituted monovalent hydrocarbon groups that contain no aliphatic unsaturated bonds, c represents a number from 0.005 to 0.3, d represents a number from 0.5 to 0.98, and e represents a number from 0.01 to 0.12, provided that c+d+e=1, and wherein said organohdrogenpolysiloxane (B-1) comprises at least three hydrogen atoms bonded to silicon atoms at the molecular chain terminals, and wherein said organohydrogenpolysiloxane (B-1) comprises at least two branching points represented by $R^4SiO_{3/2}$, and (B-2) an organohydrogenpolysiloxane represented by formula (3):

(3), wherein $R^5$ represents a substituted or unsubstituted monovalent hydrocarbon group that contains no aliphatic unsaturated bonds, f represents a number from 0.7 to 2.2 and g represents a number from 0.001 to 0.5, provided that f+g is a number within a range from 0.8 to 2.5, and wherein said organohdrogenpolysiloxane (B-2) comprises one or two hydrogen atoms bonded to silicon atoms within the molecular chain, and at least one of said hydrogen atoms bonded to silicon atoms is at a molecular chain terminal, wherein
a number α of hydrogen atoms bonded to silicon atoms derived from component (B-1) and a number β of hydrogen atoms bonded to silicon atoms derived from component (B-2) satisfy a formula (4):

$$0 < \beta/(\alpha+\beta) \leq 0.75 \quad (4),\text{ and}$$

a combined total of hydrogen atoms bonded to silicon atoms within component (B) per alkenyl group bonded to a silicon atom within component (A) is within a range from 0.1 to 5, and (C) an effective quantity of a platinum-based catalyst.

2. The silicone gel composition according to claim 1, wherein component (B-2) is a diorganopolysiloxane with both molecular chain terminals blocked with diorganohydrogensiloxy groups.

3. The silicone gel composition according to claim 1, consisting of components (A), (B) and (C).

4. The silicone gel composition according to claim 1, consisting of components (A), (B) and (C), and one or more materials selected from the group consisting of reaction retarders, inorganic fillers, heat resistance imparting agents, flame retardancy imparting agents, thixotropic imparting agents, pigments, dyes, and organopolysiloxanes that contain neither silicon atom-bonded hydrogen atoms nor silicon atom-bonded alkenyl groups.

5. A cured product having a penetration value prescribed in JIS K-2207 of 10 to 200, obtained by curing the silicone gel composition according to claim 1.

6. An electronic component encapsulated with the cured product according to claim 5.

* * * * *